United States Patent
Nam et al.

(10) Patent No.: US 9,632,355 B2
(45) Date of Patent: Apr. 25, 2017

(54) DISPLAY DEVICE

(71) Applicant: Samsung Display Co., Ltd., Yongin, Gyeonggi-Do (KR)

(72) Inventors: Jieun Nam, Seoul (KR); Seki Park, Hwaseong-si (KR); Dongyeon Kang, Seoul (KR); Seokhyun Nam, Seoul (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 66 days.

(21) Appl. No.: 14/813,355

(22) Filed: Jul. 30, 2015

(65) Prior Publication Data

US 2016/0103364 A1 Apr. 14, 2016

(30) Foreign Application Priority Data

Oct. 10, 2014 (KR) .................. 10-2014-0136868

(51) Int. Cl.
*G02F 1/1335* (2006.01)

(52) U.S. Cl.
CPC .. *G02F 1/133603* (2013.01); *G02F 1/133526* (2013.01); *G02F 1/133553* (2013.01); *G02F 1/133621* (2013.01); *G02F 2001/133607* (2013.01)

(58) Field of Classification Search
CPC .................. G02F 1/133603; G02F 1/133553
See application file for complete search history.

(56) References Cited

U.S. PATENT DOCUMENTS

| | | | | |
|---|---|---|---|---|
| 2010/0128199 A1* | 5/2010 | Kim | .................. | G02F 1/133603 349/61 |
| 2014/0253849 A1* | 9/2014 | Poon | .................... | G02B 27/102 349/97 |
| 2014/0354914 A1* | 12/2014 | Lee | .................... | G02F 1/133608 349/58 |
| 2015/0109764 A1 | 4/2015 | Nam et al. | | |
| 2015/0138759 A1* | 5/2015 | Nameda | ............ | G02F 1/133603 362/97.2 |
| 2015/0168775 A1* | 6/2015 | Chang | .................. | G02B 6/0031 362/97.1 |
| 2015/0219966 A1* | 8/2015 | Song | .................. | G02B 19/0071 362/97.3 |

(Continued)

FOREIGN PATENT DOCUMENTS

KR 10-2006-0049072 A 5/2006
KR 10-2007-0087751 A 8/2007

(Continued)

*Primary Examiner* — Timothy L Rude
(74) *Attorney, Agent, or Firm* — Robert E. Bushnell, Esq.

(57) ABSTRACT

A display device includes a backlight assembly including a light emitting unit to emit a light and a display panel receiving the light and displaying an image. The light emitting unit includes a light emitting diode package, an optical lens, and a reflective layer. The light emitting diode package includes at least two light emitting diodes to emit lights having different colors. The optical lens covers the light emitting diode package and includes a first lens surface and a second lens surface changing an optical path of the light incident through the first lens surface. The reflective layer is partially disposed on the first lens surface.

18 Claims, 6 Drawing Sheets

(56) References Cited

U.S. PATENT DOCUMENTS

2015/0234232 A1* 8/2015 Lam .................. G02F 1/133603
  349/42
2015/0338057 A1* 11/2015 Kim .................. G02F 1/133603
  362/97.3
2015/0377426 A1* 12/2015 Ogata ............... G02F 1/133603
  362/311.01

FOREIGN PATENT DOCUMENTS

| KR | 10-2007-0117689 A | 12/2007 |
| KR | 10-2013-0112577 A | 10/2013 |

* cited by examiner ized Serial No. 10-2014-0136868.

DISPLAY DEVICE

CLAIM OF PRIORITY

This application makes reference to, incorporates the same herein, and claims all benefits accruing under 35 U.S.C. §119 from an application earlier filed in the Korean Intellectual Property Office on 10 Oct. 2014 and there duly assigned Serial No. 10-2014-0136868.

BACKGROUND OF THE INVENTION

Field of the Invention

The present disclosure relates to a display device. More particularly, the present disclosure relates to a display device having a backlight assembly.

Description of the Related Art

A display device, such as a liquid crystal display device, requires light to display an image. To this end, the display device includes a display panel displaying the image and a backlight assembly providing the light to the display panel. The backlight assembly for the display device is classified into a direct-illumination type backlight assembly and an edge-illumination type backlight assembly according to a position of light emitting units thereof.

According to the direct-illumination type backlight assembly, the light emitting units of the backlight assembly are disposed under the display panel to provide the display panel with the light. In this case, an optical lens is used to control a direction in which the light emitted from the light emitting units travels.

SUMMARY OF THE INVENTION

The present disclosure provides a display device including a light emitting unit that emits a light with a uniform color to improve display quality.

Embodiments of the inventive concept provide a display device including a backlight assembly including a light emitting unit to emit a light and a display panel receiving the light and displaying an image.

The light emitting unit includes a light emitting diode package, an optical lens, and a reflective layer. The light emitting diode package includes at least two light emitting diodes to emit lights having different colors. The optical lens covers the light emitting diode package and includes a first lens surface and a second lens surface changing an optical path of the light incident through the first lens surface. The reflective layer is partially disposed on the first lens surface.

The light emitting unit further includes a circuit board and a reflective pattern. The light emitting diode package is mounted on the circuit board and the reflective pattern is disposed on the circuit board and covered by the optical lens.

The second lens surface has a round shape inclined from a center portion thereof to an edge thereof when viewed from a cross-sectional view, the light generated by the light emitting diode package is incident to the optical lens through the first lens surface, and the incident light exits from the optical lens after being refracted by the second lens surface.

When viewed from a cross-sectional view, the second lens surface includes a first inclination surface inclined from one side of the second lens surface to the first lens surface and a second inclination surface inclined from the other side of the second lens surface to the first lens surface, the light generated by the light emitting diode package is incident to the optical lens through the first lens surface, and the incident light exits from the optical lens after being reflected by the second lens surface.

According to the above, the reflective pattern is disposed on the optical lens covering the light emitting unit of the backlight assembly, and thus the color lights emitted from the light emitting diodes are easily mixed with each other before the color lights exit through the optical lens. Thus, a color breakup phenomenon, in which the color lights are separately perceived, may be prevented from occurring.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
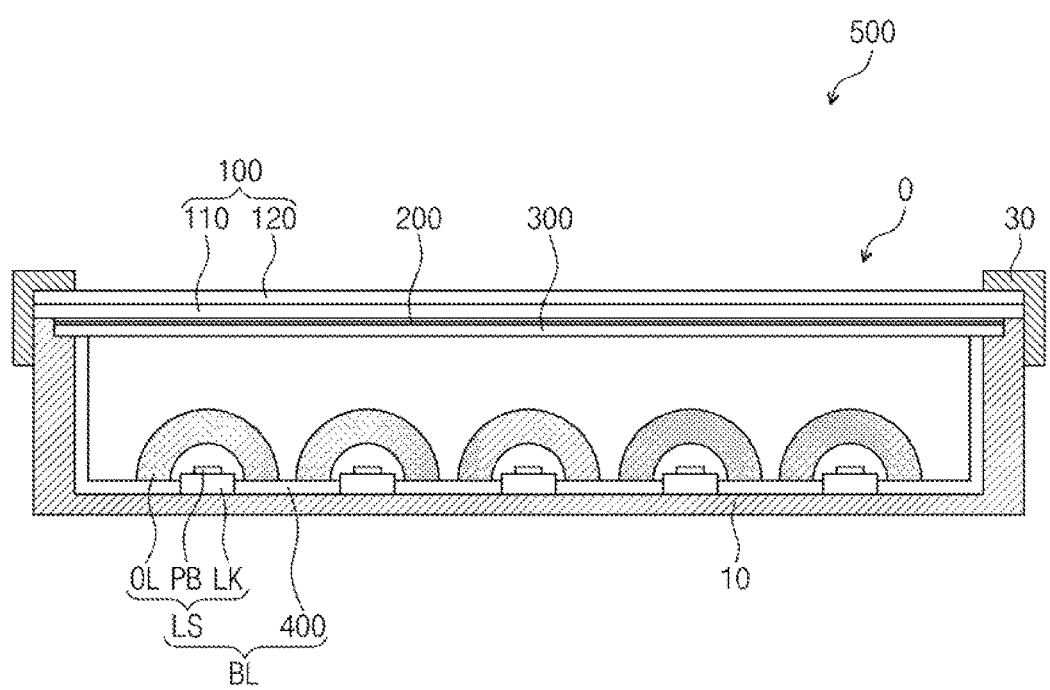
FIG. 1 is a cross-sectional view showing a display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a cross-sectional view showing a display device 500 according to an exemplary embodiment of the present disclosure.

In reference to FIG. 1, the display device 500 includes a display panel 100, a backlight assembly BL, an accommodating member 10, and a cover member 30.

In the present exemplary embodiment, the display panel 100 may be, but not limited to, a liquid crystal display panel. The display panel 100 receives a light provided from the backlight assembly BL and displays an image using the light. The display panel 100 includes a first substrate 110, a second substrate 120, and a liquid crystal layer (not shown) interposed between the first substrate 110 and the second substrate 120.

The first substrate 110 includes a plurality of pixels disposed thereon. Each pixel includes a pixel electrode (not shown) and a thin film transistor (not shown) to switch a driving signal applied to the pixel electrode. The second substrate 120 includes a common electrode (not shown) and a color filter (not shown), which are disposed on the second substrate 120. The common electrode faces the pixel electrode such that the liquid crystal layer is disposed between the common electrode and the pixel electrode. The common electrode forms an electric field, which is applied to the liquid crystal layer (not shown), in cooperation with the pixel electrode. The color filter is disposed to overlap with the pixel electrode to filter the light provided from the backlight assembly to a color light.

The structure of the display panel 100 should not be limited to the above-mentioned structure. According to another embodiment, for instance, the color filter may be disposed on the first substrate 110 to overlap with the pixel electrode, and the common electrode may be disposed on the first substrate 110 to be spaced apart from the pixel electrode.

The backlight assembly BL is accommodated in the accommodating member 10 and provides the light to the display panel 100. The backlight assembly BL includes light emitting units LS, a reflective plate 400, a diffusion plate 300, and optical sheets 200.

The light emitting units LS emit the light. The light emitting units LS include a plurality of circuit boards PB, a plurality of light emitting diode packages LK, and a plurality of optical lenses OL.

The circuit boards PB are accommodated in the accommodating member 10, disposed on a bottom portion of the accommodating member 10, and spaced apart from each other. The light emitting diode packages LK are respectively mounted on the circuit boards PB and emit the light in response to a voltage source provided from the circuit boards PB.

The optical lenses OL correspond to the light emitting diode packages LK in a one-to-one correspondence and cover the light emitting diode packages LK. The optical lenses OL change an optical path of the light from the light emitting diode packages LK. The optical lenses OL will be described in detail later with reference to FIGS. 2A and 2B.

The reflective plate 400 is disposed on the bottom portion of the accommodating member 10. Accordingly, the light provided to the reflective plate 400 is reflected by the reflected plate 400, and then travels to the display panel 100 again.

The reflective plate 400 includes a plurality of thru-holes HL (in reference to FIG. 2A) formed therethrough and the light emitting diode packages LK are inserted into the thru-holes in a one-to-one correspondence. Therefore, the light emitting diode packages LK are exposed in an accommodating space of the accommodating member 10.

The diffusion plate 300 is disposed on the reflective plate 400 and the light emitting unit LS. The diffusion plate 300 includes a diffusion agent such as titanium oxide. Thus, the light emitted from the light emitting unit LS and the light reflected by the reflective plate 400 are diffused by the diffusion plate 300 and then provided to the display panel 100.

The optical sheets 200 are disposed between the display panel 100 and the diffusion plate 300. The optical sheets 200 are configured to include a diffusion sheet to diffuse the light and a prism sheet.

The display panel 100 is disposed on the optical sheets 200 and the accommodating member 10 provides the accommodating space in which the backlight assembly BL and the display panel 100 are accommodated. The cover member 30 is coupled with the accommodating member 10 to cover the display panel 100. The cover member 30 is provided with an opening O formed therethrough to correspond to a display area of the display panel 100, and thus the display area of the display panel 100 is exposed to the outside through the opening.

Figure 2A:
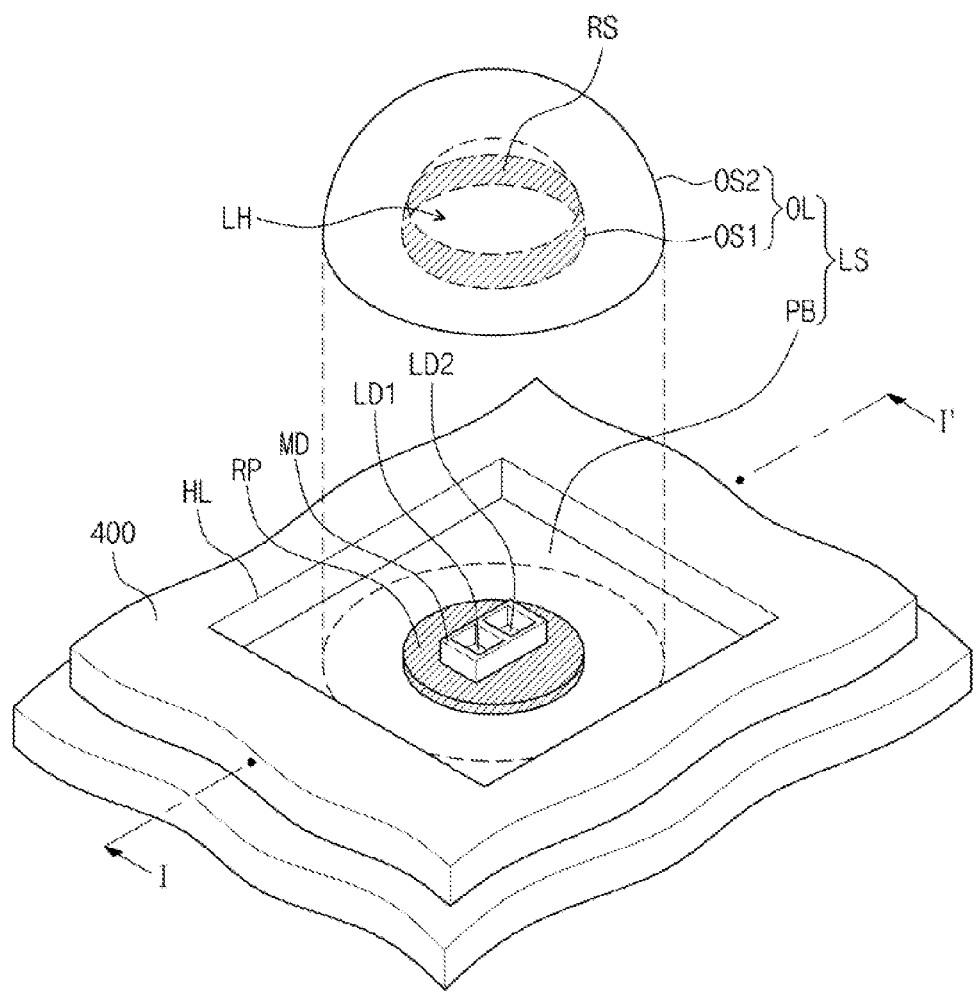
FIG. 2A is a perspective view showing one light emitting unit among light emitting units shown in FIG. 1.
Figure 2B:
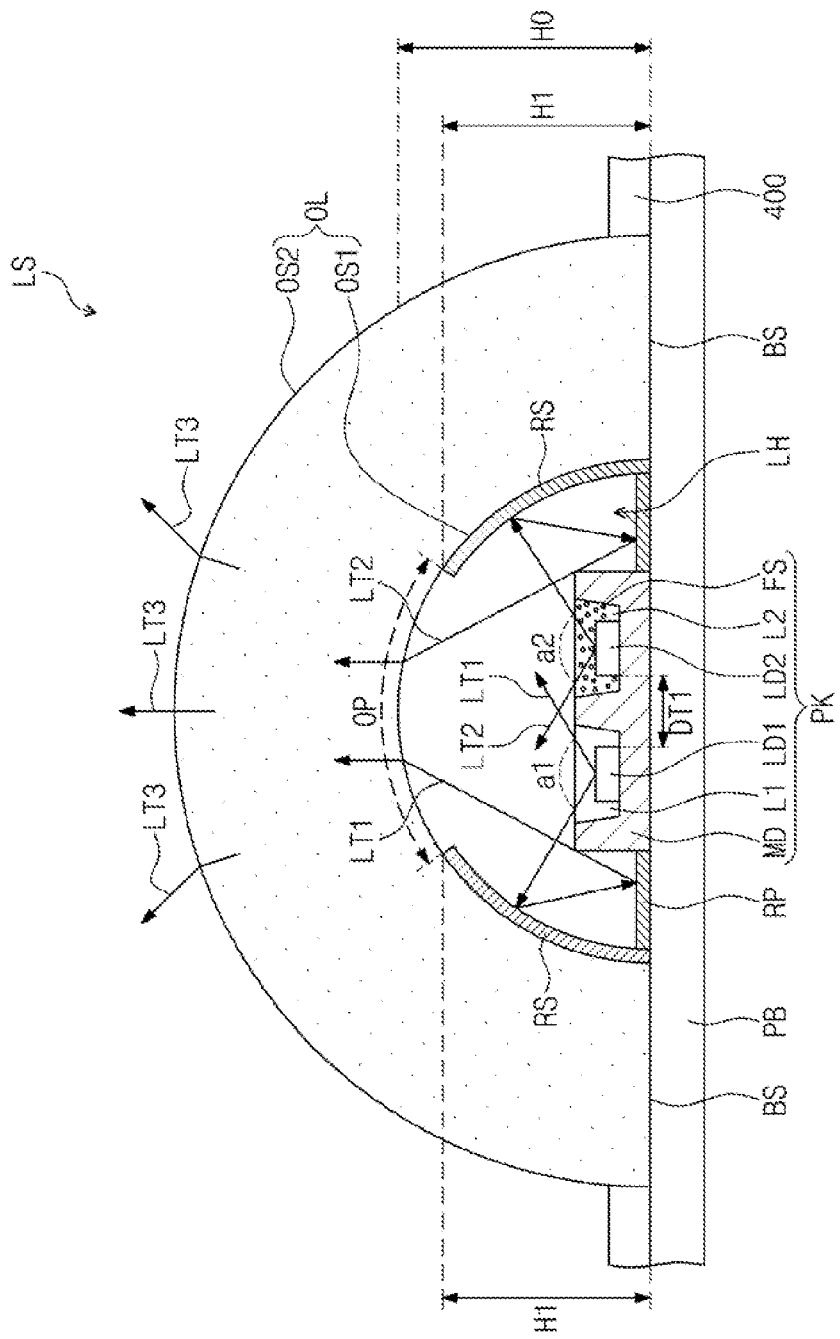
FIG. 2B is a cross-sectional view taken along a line I-I' of FIG. 2A.

FIG. 2A is a perspective view showing one light emitting unit among the light emitting units shown in FIG. 1 and FIG. 2B is a cross-sectional view taken along a line I-I' of FIG. 2A.

Hereinafter, the light emitting unit LS among the light emitting units shown in FIG. 1 will be described in detail with reference to FIGS. 2A and 2B.

The optical lens OL covers the light emitting diode package PK (hereinafter, referred to as LED package) to control the optical path of the light exiting from the LED package PK. In more detail, the reflective plate 400, the LED package PK, and the optical lens OL are disposed on the circuit board PB, but the optical lens OL covers the LED package PK exposed through the thru-hole HL formed through the reflective plate 400.

The LED package PK includes a mold MD, a first light emitting diode LD1 emitting a first color light LT1, a second light emitting diode LD2 emitting a second color light LT2 having a color different from that of the first color light LT1, a first insulating layer L1, a second insulating layer L2, and a wavelength changing member FS.

The mold MD includes a white plastic and has a light reflection property. The first insulating layer L1 is accommodated in the mold MD to cover the first light emitting diode LD1 and the second insulating layer L2 is accommodated in the mold MD to cover the second light emitting diode LD2.

The first and second color lights LT1 and LT2 are mixed with each other to form a white exit light LT3. In more detail, when the first color light LT1 is a green light and the second color light LT2 is a magenta light, the white exit light LT3 is obtained by mixing the green light with the magenta light. To this end, the first light emitting diode LD1 emits the green light, the second light emitting diode LD2 emits a blue light, and the wavelength changing member FS converts the blue light to the magenta light.

In the present exemplary embodiment, the white exit light LT3 is formed by combination of the first light emitting diode LD1, the second light emitting diode LD2, and the wavelength changing member FS, but it should not be limited to the combination. For instance, according to another embodiment, the first light emitting diode LD1 emits a red light, the second light emitting diode LD2 emits the blue light, and the wavelength changing member FS converts the blue light to a cyan light. Accordingly, when the red light and the cyan light are mixed with each other, the white exit light LT3 is realized.

In the present exemplary embodiment, the wavelength changing member FS includes a fluorescent substance, but it should not be limited thereto or thereby. According to another embodiment, the wavelength changing member FS may include a quantum dot.

In the present exemplary embodiment, the optical lens OL has a top emission structure. In this case, a lens recess LH is formed on a bottom surface BS of the optical lens OL and a first lens surface OS1 is defined by the lens recess LH. When viewed from a cross-sectional view, the first lens surface OS1 has a round shape inclined to an edge of the first lens surface OS1 from a center portion of the first lens surface OS1.

In addition, a second lens surface OS2 is defined at an outermost surface of the optical lens OL and the second lens surface OS2 is disposed at an upper portion of the first lens surface OS1. When viewed from a cross-sectional view, the second lens surface OS2 has a round shape inclined to an edge of the second lens surface OS2 from a center portion of the second lens surface OS2.

According to the structure of the optical lens OL, the first and second color lights LT1 and LT2 are incident to the first lens surface OS1 and the exit light LT3, which is obtained by mixing the first and second color lights LT1 and LT2 with each other, exits through the second lens surface OS2 and travels upwardly. The exit light LT3 is refracted by the second lens surface OS2 while exiting through the second lens surface OS2.

A reflective pattern RP is disposed on the circuit board PB. The reflective pattern RP is covered by the optical lens OL. In the present exemplary embodiment, the reflective pattern RP surrounds the light emitting diode package PK.

A reflective layer RS includes a material having a light reflection property and is partially disposed on the first lens surface OS1. The reflective layer RS includes a metal material, e.g. silver (Ag), aluminum (Al), etc., and is coated on the first lens surface OS1.

The reflective layer RS is provided with an opening OP formed therethrough to correspond to the light emitting diode package PK. When viewed from a cross-sectional view, the reflective layer RS has a symmetrical shape with respect to the opening OP. In detail, when a maximum height between the bottom surface BS and the first lens surface OS1 is referred to as "H0", both sides of the reflective layer RS are disposed on the first lens surface OS1 between the bottom surface BS and a first height H1 smaller than the maximum height H0.

According to the structure of the reflective layer RS and the reflective pattern RP, portions of the first and second color lights LT1 and LT2 are reflected by the reflective layer RS, the reflective pattern RP, and the mold MD and incident to the optical lens OS through the first lens surface OS1 as shown in FIG. 2B. Accordingly, the optical paths of the first and second color lights LT1 and LT2 become random in the lens recess LH, and thus the first and second color lights LT1 and LT2 are easily mixed with each other. Therefore, a color purity of the exit light LT3 exiting from the optical lens OL through the second lens surface OS2 may be improved.

In the present exemplary embodiment, the first color light LT1 is emitted from the first light emitting diode LD1 at a first angle a1, the second color light LT2 is emitted from the second light emitting diode LD2 at a second angle a2, and each of the first and second angles a1 and a2 is in a range from about 100 degrees to about 150 degrees. In this case, since the first and second light emitting diodes LD1 and LD2 are spaced apart from each other by a first distance DT1, an area, in which the first and second angles a1 and a2 are not overlapped with each other, may occur in the lens recess LH.

Different from the present exemplary embodiment of the present disclosure, when the reflective layer RS and the reflective pattern RP are omitted, the first and second color lights LT1 and LT2 are incident to the optical lens OL at the first and second angles a1 and a2, respectively, and thus the first and second color lights LT1 and LT2 are not mixed with each other in the area in which the first and second angles a1 and a2 are not overlapped with each other. As a result, a color breakup phenomenon, in which the first and second color lights LT1 and LT2 are separately perceived in the exit light LT3, occurs. However, according to the present exemplary embodiment, since the optical paths of the first and second color lights LT1 and LT2 become various in the lens recess LH, the color breakup phenomenon may be prevented from occurring, and thus the color purity of the exit light LT3 may be improved.

Figure 3:
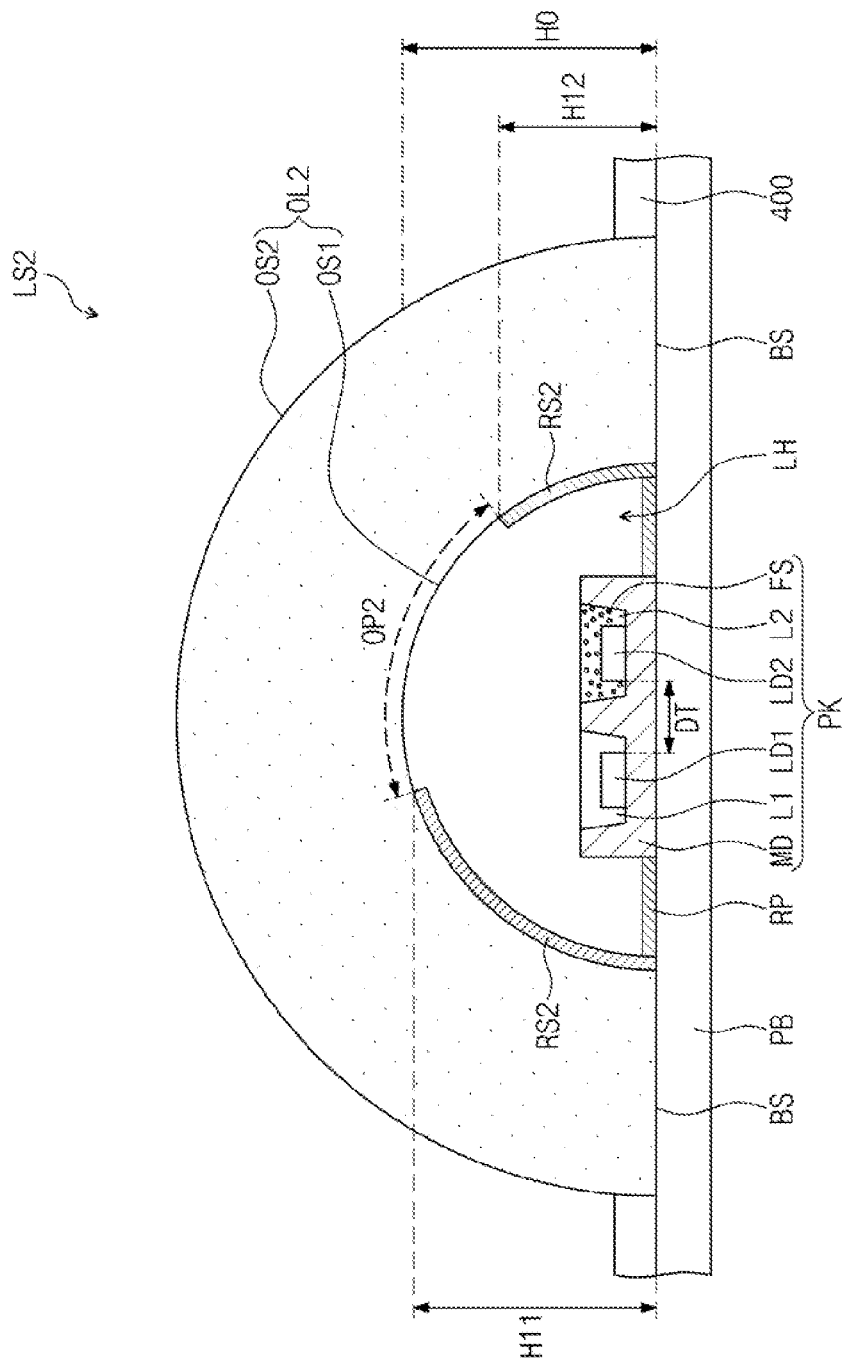
FIG. 3 is a cross-sectional view showing a light emitting unit according to another exemplary embodiment of the present disclosure.

FIG. 3 is a cross-sectional view showing a light emitting unit LS2 according to another exemplary embodiment of the present disclosure. In FIG. 3, the same reference numerals denote the same elements in FIGS. 1, 2A, and 2B, and thus detailed descriptions of the same elements will be omitted.

In reference to FIG. 3, the light emitting unit LS2 for the display device includes an optical lens OL2 having the top emission structure. The optical lens OL2 includes a first lens surface OS1 and a second lens surface OS2 and a reflective layer RS2 is partially disposed on the first lens surface OS1.

The reflective layer RS2 is provided with an opening OP2 formed therethrough to correspond to the light emitting diode package PK. In the present exemplary embodiment, the reflective layer RS2 has a non-symmetrical shape with respect to the opening OP2 when viewed from a cross-sectional view. That is, the opening OP2 is not disposed at a position corresponding to a center portion of the optical lens OL2 and disposed closer to one side of the optical lens OL2 than the other side of the optical lens OL2.

In more detail, when a maximum height between the bottom surface BS of the optical lens OL2 and the first lens surface OS1 is referred to as "H0", one side of the reflective layer RS2 is disposed on the first lens surface OS1 between the bottom surface BS and a first height H11 smaller than the maximum height H0 and the other side of the reflective layer RS2 is disposed on the first lens surface OS1 between the bottom surface BS and a second height H12 smaller than the first height H11.

The reason that the reflective layer RS2 has the non-symmetrical shape with respect to the opening OP2 is as follows. In reference to FIG. 2B again, the first and second color lights LT1 and LT2 are emitted from the first and second light emitting diodes LD1 and LD2 at the first and second angles a1 and a2, respectively. When the first angle a1 is different from the second angle a2, the area, in which the first and second color lights LT1 and LT2 are mixed with each other, is disposed closer to one side of the optical lens OL2 than the other side of the optical lens OL2. In the light emitting unit LS2 shown in FIG. 3, the first and second angles a1 and a2 become different from each other by the fluorescent substance FS, and thus each of the area, in which the first and second color lights LT1 and LT2 are mixed with each other, and the opening OP2 is disposed closer to the second light emitting diode LD2.

According to another embodiment, the area, in which the first and second color lights LT1 and LT2 are mixed with each other, may be disposed closer to the first light emitting diode LD1 according to the positions of the first and second light emitting diodes LD1 and LD2 in the lens recess LH.

Figure 4:
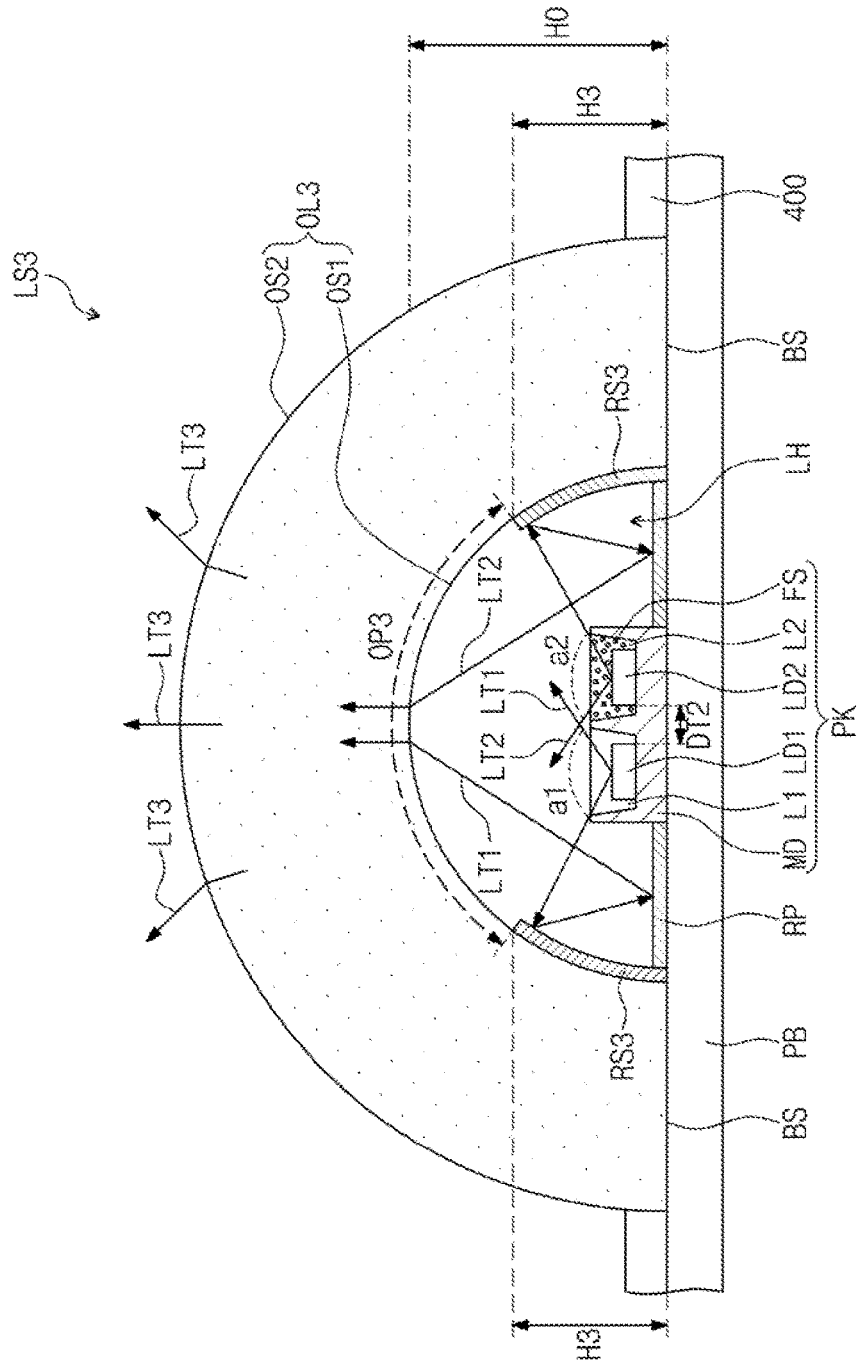
FIG. 4 is a cross-sectional view showing a light emitting unit according to another exemplary embodiment of the present disclosure.

FIG. 4 is a cross-sectional view showing a light emitting unit LS3 according to another exemplary embodiment of the present disclosure. In FIG. 4, the same reference numerals denote the same elements in FIGS. 1 to 3, and thus detailed descriptions of the same elements will be omitted.

In reference to FIG. 4, the light emitting unit LS3 for the display device includes an optical lens OL3 having the top emission structure. The optical lens OL3 includes a first lens surface OS1 and a second lens surface OS2 and a reflective layer RS3 is partially disposed on the first lens surface OS1.

The reflective layer RS3 is provided with an opening OP3 formed therethrough to correspond to the light emitting diode package PK. When viewed from a cross-sectional view, the reflective layer RS3 has a symmetrical shape with respect to the opening OP3 and is disposed at a position corresponding to a center portion of the optical lens OL3.

In more detail, when a maximum height between the bottom surface BS of the optical lens OL3 and the first lens surface OS1 is referred to as "H0", both sides of the reflective layer RS3 are disposed on the first lens surface OS1 between the bottom surface BS of the optical lens OL3 and a third height H3 smaller than the maximum height H0.

Meanwhile, the first and second light emitting diodes LD1 and LD2 are spaced apart from each other by the first distance DT1 in the light emitting unit LS shown in FIG. 2B, and the first and second light emitting diodes LD1 and LD2 are spaced apart from each other by a second distance DT2 smaller than the first distance DT1 in the light emitting unit LS3 shown in FIG. 4. Accordingly, the area, in which the first and second angles a1 and a2 of the first and second color lights LT1 and LT2 are overlapped with each other, is increased, so that the first and second color lights LT1 and LT2 may be easily mixed with each other in the lens recess LH of the light emitting unit LS3 shown in FIG. 4 compared to the light emitting unit LS shown in FIG. 2B. As a result, the opening OP3 shown in FIG. 4 is greater than the opening OP2 shown in FIG. 2B, and the third height H3 shown in FIG. 4 is smaller than the first height H1 shown in FIG. 2B.

On the contrary, when the distance between the first and second light emitting diodes LD1 and LD2 shown in FIG. 4 is greater than the first distance DT1 shown in FIG. 2B, the opening OP3 shown in FIG. 4 may be smaller than the opening OP shown in FIG. 2B.

Figure 5:
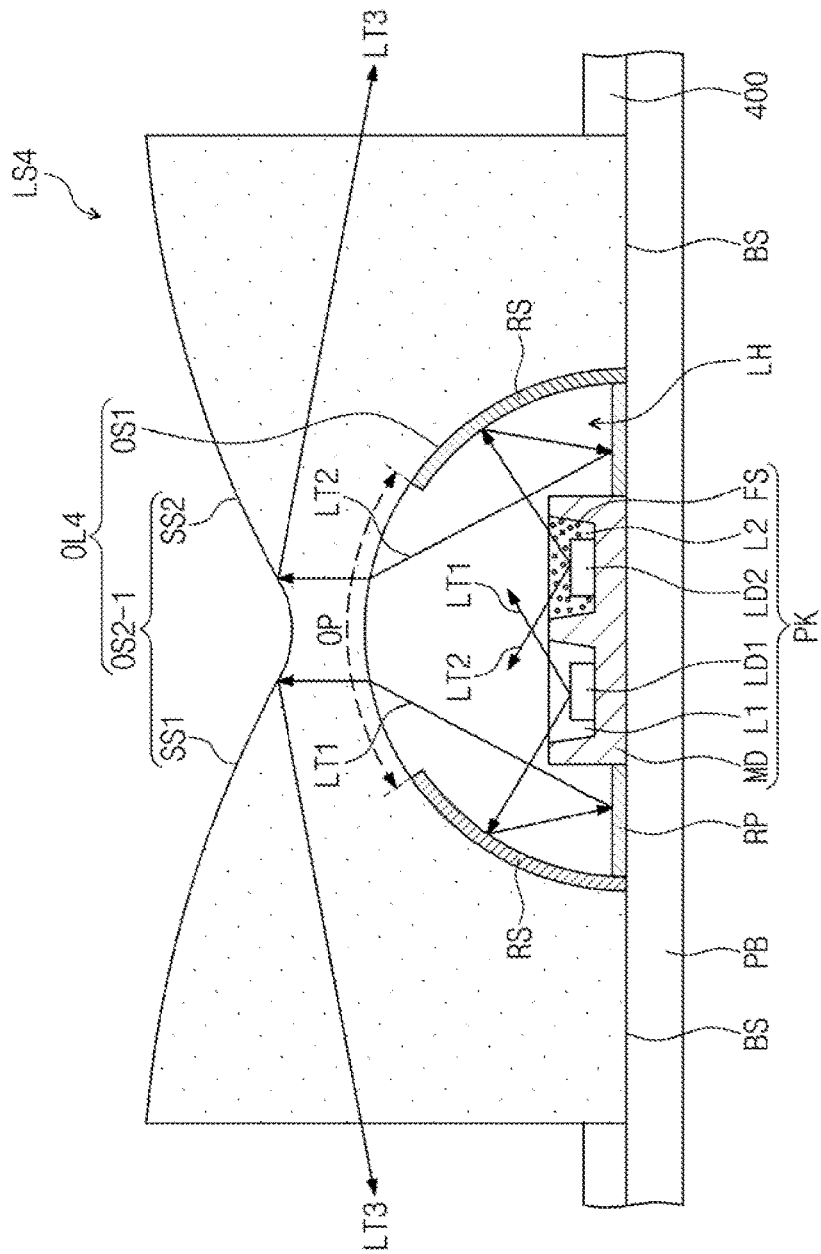
FIG. 5 is a cross-sectional view showing a light emitting unit according to another exemplary embodiment of the present disclosure.

FIG. 5 is a cross-sectional view showing a light emitting unit LS4 according to another exemplary embodiment of the present disclosure. In FIG. 5, the same reference numerals denote the same elements in FIGS. 1 to 4, and thus detailed descriptions of the same elements will be omitted.

In reference to FIG. 5, the light emitting unit LS4 for the display device includes an optical lens OL4. The optical lens OL4 has a side emission structure and includes a first lens surface OS1 and a second lens surface OS2-1.

The reflective layer RS is partially disposed on the first lens surface OS1. The second lens surface OS2-1 includes a first inclination surface SS1 and a second inclination surface SS2 connected to the first inclination surface SS1. The first inclination surface SS1 is inclined from one side of the second lens surface OS2-1 to the first lens surface OS1 and the second inclination surface SS2 is inclined from the other side of the second lens surface OS2-1 to the first lens surface OS1.

According to the structure of the optical lens OL4, the optical paths of the first and second color lights LT1 and LT2 become random while being reflected by the reflective layer RS, the reflective pattern RP, and the mold MD, and thus the first and second color lights LT1 and LT2 are easily mixed with each other. The mixed first and second color lights LT1 and LT2 are incident to the optical lens OL4 through the first lens surface OS1. In addition, the first and second color lights LT1 and LT2 incident to the optical lens OL4 exits as the exit light LT3 through a side portion of the optical lens OL4 after being reflected by the second lens surface OS2-1.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. A display device comprising:
   a backlight assembly comprising a light emitting unit; and
   a display panel receiving light from the light emitting unit and displaying an image,
   wherein the light emitting unit comprises:
      a light emitting diode package comprising at least two light emitting diodes to emit lights having different colors respectively;
      an optical lens covering the light emitting diode package and comprising a first lens surface and a second lens surface changing an optical path of the lights incident through the first lens surface; and
      a reflective layer partially disposed on the first lens surface.
2. The display device of claim 1, wherein the light emitting unit further comprises:
   a circuit board on which the light emitting diode package is mounted; and
   a reflective pattern disposed on the circuit board and covered by the optical lens.

3. The display device of claim 2, wherein the reflective pattern surrounds the light emitting diode package.

4. The display device of claim 1, wherein the optical lens is provided with a lens recess formed therein to define the first lens surface and the second lens surface is disposed above the first lens surface.

5. The display device of claim 4, wherein the first lens surface has a round shape inclined from a center portion thereof to an edge thereof when viewed from a cross-sectional view.

6. The display device of claim 4, wherein the reflective layer is provided with an opening formed therethrough to correspond to the light emitting diode package when viewed from a cross-sectional view.

7. The display device of claim 6, wherein the reflective layer has a symmetrical shape with respect to the opening when viewed from a cross-sectional view.

8. The display device of claim 7, wherein the optical lens comprises a bottom surface connected between the first lens surface and the second lens surface and the reflective layer is disposed on the first lens surface between the bottom surface and a first height smaller than a maximum height between the bottom surface and the first lens surface.

9. The display device of claim 6, wherein the reflective layer has a non-symmetrical shape with respect to the opening when viewed from a cross-sectional view.

10. The display device of claim 9, wherein the optical lens comprises a bottom surface connected between the first lens surface and the second lens surface, one side of the reflective layer is disposed on the first lens surface between the bottom surface and a second height smaller than a maximum height between the bottom surface and the first lens surface, when viewed from a cross-sectional view, and the other side of the reflective layer is disposed on the first lens surface between the bottom surface and a third height smaller than the second height when viewed from a cross-sectional view.

11. The display device of claim 6, wherein the light emitting diode package comprises:
  a first light emitting diode emitting a first color light; and
  a second light emitting diode emitting a second color light having a color different from a color of the first color light, and a size of the opening formed through the reflective layer is increased as a distance between the first and second light emitting diodes decreases.

12. The display device of claim 11, wherein the light emitting diode package further comprises a wavelength changing member disposed on the second light emitting diode, the first color light is a green light, the second color light is a blue light, and the wavelength changing member converts the second color light to a magenta light.

13. The display device of claim 4, wherein, when viewed from a cross-sectional view, the second lens surface comprises:
  a first inclination surface inclined from one side of the second lens surface to the first lens surface; and
  a second inclination surface inclined from the other side of the second lens surface to the first lens surface.

14. The display device of claim 13, wherein the light generated by the light emitting diode package is incident to the optical lens through the first lens surface and the incident light exits from the optical lens after being reflected by the second lens surface.

15. The display device of claim 4, wherein the second lens surface has a round shape inclined from a center portion of the second lens surface to an edge of the second lens surface when viewed from a cross-sectional view.

16. The display device of claim 15, wherein the light generated by the light emitting diode package is incident to the optical lens through the first lens surface and the incident light exits from the optical lens after being refracted by the second lens surface.

17. The display device of claim 1, wherein the reflective layer comprises a metal material.

18. A display device comprising:
  a backlight assembly comprising a plurality of light emitting units; and
  a display panel receiving light from the light emitting units and displaying an image,
  wherein each light emitting unit comprises:
    a light emitting diode package comprising at least two light emitting diodes to emit lights having different colors respectively;
    an optical lens covering the light emitting diode package and comprising a first lens surface and a second lens surface changing an optical path of the lights incident through the first lens surface, and the lights having different colors being mixed by the optical lens to form white light; and
    a reflective layer partially disposed on the first lens surface.

* * * * *